United States Patent [19]

Yamaguchi et al.

[11] Patent Number: 5,639,829
[45] Date of Patent: Jun. 17, 1997

[54] POLYPROPYLENE COMPOSITION

[75] Inventors: Masayoshi Yamaguchi; Akio Ishimoto; Hiroshi Wakumoto, all of Kuga-gun; Masahiro Sugi, Ichihara, all of Japan

[73] Assignee: Mitsui Petrochemical Industries, Ltd., Tokyo, Japan

[21] Appl. No.: 486,641

[22] Filed: Jun. 7, 1995

Related U.S. Application Data

[62] Division of Ser. No. 167,212, Dec. 16, 1993, abandoned.

[30] Foreign Application Priority Data

Dec. 22, 1992 [JP] Japan ................................. 4-342169

[51] Int. Cl.$^6$ ........................................................ C08L 23/04
[52] U.S. Cl. ........................... 525/240; 525/242; 525/245; 524/451
[58] Field of Search ............................. 525/240, 242, 525/245; 524/451; 428/500, 521

[56] References Cited

U.S. PATENT DOCUMENTS 5,268,220  12/1993  Tajima et al. ............................ 428/220

*Primary Examiner*—Paul J. Thibodeau
*Assistant Examiner*—Mary Critharis
*Attorney, Agent, or Firm*—Sherman and Shalloway

[57] ABSTRACT

Disclosed are a polypropylene composition comprising 95–55 parts by weight of polypropylene (A) and 5–45 parts by weight of an ethylene/1-butene random copolymer (B-1) which contains constituent units derived from 1-butene in an amount of 15 to 25% by mol; and a polypropylene composition comprising 95–55 parts by weight of polypropylene (A) and 5–45 parts by weight of an ethylene/1-octene random copolymer (B-2) which contains constituent units derived from 1-octene in an amount of 8 to 20% by mol. Each of the random copolymers (B-1) and (B-2) has an intrinsic viscosity [η] of 1.5 to 3.5 dl/g as measured in decalin, a glass transition temperature (Tg) of not higher than −50° C., a crystallinity of less than 20% as measured by X-ray diffractometry, a randomness parameter (B value) of 1.0 to 1.4 as measured by $^{13}$C-NMR spectroscopy. With respect to a melting point as measured by a differential scanning calorimeter (DSC) as the main peak, the copolymer (B-1) has a value of not higher than 60° C., while the copolymer (B-2) has a value of not higher than 80° C.

5 Claims, No Drawings

POLYPROPYLENE COMPOSITION

This is a division of application Ser. No. 08/167,212, filed Dec. 16, 1993 which is now abandoned.

FIELD OF THE INVENTION

The present invention relates to polypropylene compositions which are excellent in rigidity, heat resistance and impact resistance, particularly in low-temperature impact resistance.

BACKGROUND OF THE INVENTION

Articles molded from polypropylene are excellent in rigidity, heat resistance, surface glossiness, etc. and hence they have been widely applied to various uses.

However, polypropylene is generally crystalline and is deteriorated in impact resistance, particularly in low-temperature impact resistance, and therefore application thereof is limited to certain uses.

For increasing the impact resistance of polypropylene, conventionally adopted are a method of adding polyethylene to polypropylene and a method of adding thereto rubber-like materials such as polyisobutylene, polybutadiene and a non-crystalline ethylene/propylene copolymer. In particular, a method of adding a non-crystalline or low-crystalline ethylene/propylene random copolymer has been used in many cases.

However, the present inventors have studied on polypropylene compositions comprising the non-crystalline or low-crystalline ethylene/propylene random copolymer and polypropylene, and found that the non-crystalline or low-crystalline ethylene/propylene random copolymer cannot improve the impact resistance so much and hence the ethylene/propylene random copolymer must be contained in the polypropylene composition in a large amount to obtain satisfactory impact resistance. When a large amount of the ethylene/propylene random copolymer is contained in the polypropylene composition, the composition can be improved in the impact resistance but seriously lowered in rigidity, heat resistance and surface hardness. On the other hand, if the ethylene/propylene random copolymer is contained in the polypropylene composition in a small amount to retain rigidity, heat resistance and surface hardness, the low-temperature impact resistance of the polypropylene composition cannot be sufficiently improved.

In place of using such non-crystalline or low-crystalline ethylene/propylene random copolymer, a trial of adding other ethylene/α-olefin copolymer to polypropylene was made to obtain a polypropylene composition having high impact resistance. For example, Japanese Patent Publications No. 25693/1983 and No. 38459/1983 disclose a composition comprising crystalline polypropylene and an ethylene/1-butene copolymer which contains constituent units derived from 1-butene in an amount of not more than 15% by mol. In addition, Japanese Patent Laid Open No. 243842/1986 discloses a polypropylene composition comprising crystalline polypropylene and an ethylene/1-butene copolymer which is obtained by using a titanium heterogeneous type catalyst. The polypropylene compositions disclosed in these publications are improved in the impact resistance and the rigidity, but they are desired to be much more improved in the low-temperature impact resistance.

Further, Japanese Patent Publication No. 42929/1988 discloses a polypropylene composition comprising crystalline polypropylene and an ethylene/1-butene copolymer which contains constituent units derived from 1-butene in an amount of 25 to 10% by weight and has an intrinsic viscosity $[\eta]$ of not more than 1.5 dl/g. This polypropylene composition is insufficient in the impact resistance.

Furthermore, Japanese Patent Laid-Open No. 250040/1991 describes that an ethylene/1-butene block copolymer containing constituent units derived from 1-butene in an amount of 10 to 90% by weight is used to increase impact resistance of polypropylene. However, this ethylene/1-butene block copolymer is not good in compatibility with polypropylene and insufficient in improvement of the impact resistance.

On that account, eagerly desired now is the advent of a polypropylene composition excellent in impact resistance, particularly in low-temperature impact resistance, as well as in rigidity and heat resistance.

As a result of earnest studies by the present inventors to solve the problems associated with the prior arts, they have found a polypropylene composition comprising polypropylene and a specific ethylene/α-olefin copolymer is excellent in rigidity, heat resistance and impact resistance, particularly in low-temperature heat resistance, and accomplished the present invention.

OBJECT OF THE INVENTION

It is, therefore, an object of the present invention to provide a polypropylene composition which is excellent in rigidity, heat resistance and impact resistance, particularly in low-temperature impact resistance.

SUMMARY OF THE INVENTION

The first polypropylene composition according to the present invention is a polypropylene composition comprising:

(A) a polypropylene in an amount of 95 to 55 parts by weight; and (B-1) an ethylene/1-butene random copolymer in an amount of 5 to 45 parts by weight (provided that (A)+(B-1) is 100 parts by weight), said ethylene/1-butene random copolymer having a content of constituent units derived from 1-butene in the range of 15 to 25% by mol, an intrinsic viscosity $[\eta]$ of 1.5 to 3.5 dl/g as measured in decalin, a melting point of not higher than 60° C. as measured by a differential scanning calorimeter (DSC) as the main peak, a glass transition temperature (Tg) of not higher than −50° C., a crystallinity of less than 20% as measured by X-ray diffractometry, and a randomness parameter (B value) of 1.0 to 1.4 as measured by $^{13}$C-NMR spectroscopy.

The second polypropylene composition according to the present invention is a polypropylene composition comprising:

(A) a polypropylene in an amount of 95 to 55 parts by weight; and (B-2) an ethylene/1-octene random copolymer in an amount of 5 to 45 parts by weight (provided that (A)+(B-2) is 100 parts by weight), said ethylene/1-octene random copolymer having a content of constituent units derived from 1-octene in the range of 8 to 20% by mol, an intrinsic viscosity $[\eta]$ of 1.5 to 3.5 dl/g as measured in decalin, a melting point of not higher than 80° C. as measured by a differential scanning calorimeter (DSC) as the main peak, a glass transition temperature (Tg) of not higher than −50° C., a crystallinity of less than 20% as measured by X-ray diffractometry, and a randomness parameter (B value) of 1.0 to 1.4 as measured by $^{13}$C-NMR spectroscopy.

The above-mentioned polypropylene compositions may further contain:

(C) a propylene/ethylene copolymer in an amount of not more than 15 parts by weight, preferably 5 to 15 parts by weight based on 100 parts by weight of the above-mentioned polypropylene composition, said propylene/ethylene copolymer having a content of constituent units derived from ethylene in the range of 30 to 60% by mol and an intrinsic viscosity [η] of 2 to 12 dl/g as measured in decalin.

DETAILED DESCRIPTION OF THE INVENTION

The polypropylene composition according to the present invention will be described in detail hereinafter.

The polypropylene composition of the invention comprises (A) a polypropylene and (B-1) a specific ethylene/1-butene copolymer, or comprises (A) a polypropylene and (B-2) a specific ethylene/1-octene copolymer.

(A) Polypropylene

The polypropylene (A) used for the invention includes a homopolymer of propylene and a propylene/α-olefin copolymer containing constituent units derived from an olefin other than propylene in an amount of not more than 10% by mol.

Examples of α-olefins for constituting the propylene/α-olefin copolymer include ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene.

The copolymer of propylene with these olefins may be either a random copolymer or a block copolymer.

Further, the propylene/α-olefin copolymer may be a copolymer obtained by a process comprising the steps of prepolymerizing a homopolymer or copolymer of 3-methyl-1-butene, 3,3-dimethyl-1-butene, 3-methyl-1-pentene, 3-methyl-1-hexene, 3,5,5-trimethyl-1-hexene, vinylcylopentene, vinylcyclohexane or vinylnorbornene to a catalyst and then polymerizing propylene under the resultant prepolymerized catalyst.

In the present invention, a propylene homopolymer is preferred as the polypropylene (A).

The polypropylene (A) used for the invention has a melt flow rate (MFR), as measured at 230° C. under a load of 2,160 g in accordance with ASTM-D1238, of 0.1 to 200 g/10 min, preferably 0.3 to 100 g/10 min.

A polypropylene composition containing the polypropylene (A) having such MFR as described above shows high flowability and can be readily molded into a large-sized article. A polypropylene composition containing polypropylene having a melt flow rate higher than the above-mentioned value is deteriorated in the impact resistance.

The polypropylene (A) can be prepared by various processes. Generally, it is prepared by the use of a conventionally known stereoregular catalyst. For example, the polypropylene can be prepared by the use of a catalyst formed from a solid titanium catalyst component and an organometallic compound catalyst component and if desired an electron donor.

The solid titanium catalyst component used in this process includes a titanium catalyst component in which titanium trichloride or a titanium trichloride composition is supported on a support material having a specific surface area of not less than 100 m²/g, and a titanium catalyst component which contains magnesium, halogen, an electron donor (preferably aromatic carboxylate or ether containing alkyl group) and titanium as its essential components and in which the essential components are supported on a support material having a specific surface area of not less than 100 ²/g. Of these, the latter support type catalyst component is particularly preferably used to prepare the polypropylene.

The organometallic compound catalyst component used in the above process is preferably an organoaluminum compound. Concrete examples of the organoaluminum compound include trialkylaluminum, dialkylaluminum halide, alkylaluminum sesquihalide and alkylaluminum dihalide. Choice of the proper organoaluminum compound can be made in conformity with the kind of the titanium catalyst component used.

As the electron donor, useful are organic compounds containing a nitrogen atom, a phosphorus atom, a sulfur atom, a silicon atom or a boron atom, and preferred are silicon compounds, ester compounds or ether compounds containing these atoms.

The silicon compound preferably used in the invention is the compound represented by the following formula (i);

$$R^a{}_n\text{—Si—}(OR^b)_{4-n} \qquad (i)$$

wherein, n is 1, 2 or 3; when n is 1, $R^a$ is a secondary or a tertiary hydrocarbon group; when n is 2 or 3, at least one of $R^a$ is a secondary or a tertiary hydrocarbon group, $R^a$ may be the same or different, and $R^b$ is a hydrocarbon group of 1 to 4 carbon atoms; and when 4−n is 2 or 3, $R^b$ may be the same or different.

In the silicon compound represented by the formula (i), the secondary or the tertiary hydrocarbon group includes cyclopentyl, cyclopentenyl and cyclopentadienyl, and substituted thereof, and the hydrocarbon group in which the carbon adjacent to Si is a secondary or tertiary.

More concretely, the substituted cyclopentyl group includes cyclopentyl group having alkyl group such as 2-methylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclopentyl, 2,3-diethylcyclopentyl 2,3,4-trimethylcyclopentyl, 2,3,5-trimethylcyclopentyl, 2,3,4-triethylcyclopentyl, tetramethylcyclopentyl and tetraethylcyclopentyl;

the substituted cyclopentenyl group includes cyclopentenyl group having alkyl group such as 2-methylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5-dimethylcyclopentenyl, 2,3,4-trimethylcyclopentenyl, 2,3,5-trimethylcyclopentenyl, 2,3,4-triethylcyclopentenyl, tetramethylcyclopentenyl and tetraethylcyclopentyl;

the substituted cyclopentadienyl group includes cyclopentadienyl group having alkyl group such as 2-methylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclopentadienyl, 2,3-diethylcyclopentadienyl, 2,3,4-trimethylcyclopentadienyl, 2,3,5-trimethylcyclopentadienyl, 2,3,4-triethylcyclopentadienyl, 2,3,4,5-tetramethylcyclopentadienyl, 2,3,4,5-tetraethylcyclopentadienyl, 1,2,3,4,5-pentamethylcyclopentadienyl and 1,2,3,4,5-pentaethylcyclopentadienyl.

The hydrocarbon group in which the carbon adjacent to Si is a secondary includes i-propyl, s-butyl, s-amyl and α-benzyl; and the hydrocarbon group in which the carbon adjacent to Si is a tertiary includes t-butyl, t-amyl, α,α'-diemethylbenzyl and admantyl.

When n is 1, the silicon compound represented by the formula (i) includes trialkoxysilanes such as
cyclopentyltrimethoxysilane,
2-methylcyclopentyltrimethoxysilane,
2,3-dimethylcyclopentyltrimethoxysilane,
cyclopentyltriethoxysilane,
iso-butyltriethoxysilane,
t-butyltriethoxysilane,
cyclohexyltrimethoxysilane,
cyclohexyltriethoxysilane,
2-norbornanetrimethoxysilane, and
2-norbornanetriethoxysilane;

when n is 2, the silicon compound represented by the formula (i) includes dialkoxysilanes such as
dicyclopentyldiethoxysilane,
t-butylmethyldimethoxysilane,
t-butylmethyldiethoxysilane,
t-amylmethyldiethoxysilane,
dicyclohexyldimethoxysilane,
cyclohexylmethyldimethoxysilane,
cyclohexylmethyldiethoxysilane, and
2-norbornanemethyldimethoxysilane.

When n is 2, the silicon compound represented by the formula (i) is preferably dimethoxy compound represented by the following formula (ii);

(ii)

wherein, $R^a$ and $R^c$ are each independently a cyclopentyl group, a substituted cyclopentyl group, a cyclopentenyl group, a substituted cyclopentenyl group, cyclopentadienyl group, a substituted cyclopentadienyl group or a hydrocarbon group whose carbon adjacent to Si is a secondary carbon or a tertiary carbon.

The silicon compound represented by the formula (ii) includes, for example, dicyclopentyldimethoxysilane,
dicyclopentenyldimethoxyxilane,
dicyclopentadienyldimethoxyxilane,
di-t-butyldimethoxysilane,
di-(2-methylcyclopentyl)dimethoxysilane,
di-(3-methylcyclopentyl)dimethoxysilane,
di-(2-ethylcyclopentyl)dimethoxysilane,
di-(2,3-dimethylcyclopentyl)dimethoxysilane,
di-(2,4-dimethylcyclopentyl)dimethoxysilane,
di-(2,5-dimethylcyclopentyl)dimethoxysilane,
di-(2,3-diethylcyclopentyl)dimethoxysilane,
di-(2,3,4-trimethylcyclopentyl)dimethoxysilane,
di-(2,3,5-trimethylcyclopentyl)dimethoxysilane,
di-(2,3,4-triethylcyclopentyl)dimethoxysilane,
di-(tetramethylcyclopentyl)dimethoxysilane,
di-(tetraethylcyclopentyl)dimethoxysilane,
di-(2-methylcyclopentenyl)dimethoxysilane,
di-(3-methylcyclopentenyl)dimethoxysilane,
di-(2-ethylcyclopentenyl)dimethoxysilane,
di-(2-n-butylcyclopentenyl)dimethoxysilane,
di-(2,3-dimethylcyclopentenyl)dimethoxysilane,
di-(2,4-dimethylcyclopentenyl)dimethoxysilane,
di-(2,5-dimethylcyclopentenyl)dimethoxysilane,
di-(2,3,4-trimethylcyclopentenyl)dimethoxysilane,
di-(2,3,5-trimethylcyclopentenyl)dimethoxysilane,
di-(2,3,4-triethylcyclopentenyl)dimethoxysilane,
di-(tetramethylcyclopentenyl)dimethoxysilane,
di-(tetraethylcyclopentenyl)dimethoxysilane,
di-(2-methylcyclopentadienyl)dimethoxysilane,
di-(3-methylcyclopentadienyl)dimethoxysilane,
di-(2-ethylcyclopentadienyl)dimethoxysilane,
di-(2-n-butylcyclopentadienyl)dimethoxysilane,
di-(2,3-dimethylcyclopentadienyl)dimethoxysilane,
di-(2,4-dimethylcyclopentadienyl)dimethoxysilane,
di-(2,5-dimethylcyclopentadienyl)dimethoxysilane,
di-(2,3-diethylcyclopentadienyl)dimethoxysilane,
di-(2,3,4-trimethylcyclopentadienyl)dimethoxysilane,
di-(2,3,5-trimethylcyclopentadienyl)dimethoxysilane,
di-(2,3,4-triethylcyclopentadienyl)dimethoxysilane,
di-(2,3,4,5-tetramethylcyclopentadienyl)dimethoxysilane,
di-(2,3,4,5-tetraethylcyclopentadienyl)dimethoxysilane,
di-(1,2,3,4,5-pentamethylcyclopentadienyl) dimethoxysilane,
di-(1,2,3,4,5-pentaethylcyclopentadienyl)dimethoxysilane,
di-t-amyl-dimethoxysilane,
di-(α,α'-dimethylbenzyl)dimethoxysilane,
di-(admantyl)dimethoxysilane,
admantyl-t-butyldimethoxysilane,
cyclopentyl-t-butyldimethoxysilane,
di-isopropyldimethoxysilane,
di-s-butyldimethoxysilane,
di-s-amyldimethoxysilane, and
isopropyl-s-butyldimethoxysilane.

When n is 3, the silicon compound represented by the formula (i) includes monoalkoxysilanes such as
tricyclopentylmethoxysilane, tricyclopentylethoxysilane,
dicyclopentylmethylmethoxysilane,
dicyclopentylethylmethoxysilane,
dicyclopentylmethylethoxysilane,
dicyclopentyldimethylmethoxysilane,
cyclopentyldiethylmethoxysilane, and
cyclopentyldimethylethoxysilane.

Of these, preferred are dimethoxysilanes, particularly preferred are dimethoxysilanes, to be concretely, preferably used is dicyclopentyldimethoxysilane, di-t-butyldimethoxysilane, di-(2-methylcyclopentyl)dimethoxysilane, di-(3-methylcyclopentyl)dimethoxysilane or di-t-amyldimethoxysilane.

The catalyst used in the above process may be activated by means of copulverization or other means. Further, the catalyst may be prepolymerized with olefin as described before.

In preparing the polypropylene, an olefin polymerized prepolymerized solid titanium catalyst component is preferably used. An olefin for preparing the prepolymerized solid titanium catalyst component includes olefins having a branched structure such as 3-methyl-1-butene, 3-methyl-1-pentene, 3-ethyl-1-pentene, 4-methyl1-pentene, 4-methyl-1-hexene, 4,4-dimethyl-1-hexene, 4,4-dimethyl-1-pentene, 4-ethyl-1-hexene, 3-ethyl-1-hexene, allylnaphthalene, allylnorbornene, stylene, dimethylstylenes, vinylnaphthalene, allyltoluenes, allylbenzene, vinylcyclohexane, vinylcyclopentane, vinylcycloheptane and allyltrialkylsilanes. Of these, preferred are 3-methyl-1-butene, 3-methyl-1-pentene, 3-ethyl-1-hexene, vinylcylcohexane, allyltrimethylsilane and dimethylstylene, more preferred are 3-methyl-1-butene, vinylcyclohexene and allyltrimethylsilane, and particularly preferred is 3-methyl-1-butene.

Furthermore, linear chain olefins such as ethylene, propylene, 1-butene, 1-octene, 1-hexadecene and 1-eicocene may be used in combination with the above-mentioned branched olefins.

Details of the process for preparing polypropylene using the support type catalyst component are described in, for example, Japanese Patent Laid-Open No. 108385/1975, No. 126590/1975, No. 20297/1976, No. 28189/1976 and No. 151691/1977. Further, details of the process for preparing a propylene block copolymer are described in, for example, Japanese Patent Laid-Open No. 98045/1977 and Japanese Patent No. 26613/1982. The techniques described in these publications can be applied to the present invention.

(B-1) Ethylene/1-butene Random Copolymer

The ethylene/1-butene random copolymer (B-1) used for the invention contains constituent units derived from 1-butene in an amount of 15 to 25% by mol, preferably 18 to 20% by mol.

The ethylene/1-butene random copolymer (B-1) containing constituent units derived from 1-butene in such an amount as described above has a glass transition temperature of not higher than −50° C., preferably not higher than −60° C., and has a melting point of not higher than 60° C., preferably not higher than 50° C. This melting point is measured as the main peak by a differential scanning calorimeter (DSC).

An intrinsic viscosity [η] of the ethylene/1-butene random copolymer (B-1) used for the invention, as measured in decalin at 135° C., is in the range of 1.5 to 3.5 dl/g, preferably 2.0 to 3.0 dl/g.

A crystallinity thereof as measured by X-ray diffractometry is less than 20%, preferably not more than 10%.

Further, in the ethylene/1-butene random copolymer (B-1) used for the invention, a parameter (B value) which indicates randomness of a copolymerized monomer chain distribution as measured by $^{13}$C-NMR spectroscopy is in the range of 1.0 to 1.4.

The B value of the ethylene/1-butene random copolymer (B-1) is an index of composition distribution of constituent units derived from each monomers in the copolymer chain, and can be determined by dividing a molar fraction of the ethylene/1-butene alternating chain in all the dyad chains of the copolymer by a number twice as much as the product of the ethylene content (molar fraction) by the 1-butene content (molar fraction). That is, the B value can be calculated from the following formula:

$$B = \frac{P_{BE}}{2 P_B \cdot P_E}$$

wherein $P_E$ and $P_B$ are a molar fraction of the ethylene component and a molar fraction of the 1-butene component, respectively, contained in the ethylene/1-butene copolymer; and $P_{BE}$ is a molar fraction of the 1-butene/ethylene chain in all the dyad chains.

The values for $P_E$, $P_B$ and $P_{BE}$ can be obtained in the following manner.

In a sample tube having a diameter of 10 mm, about 200 mg of an ethylene/1-butene copolymer is homogeneously dissolved in 1 ml of hexachlorobutadiene to give a sample, and a $^{13}$C-NMR spectrum of the sample is measured under the following conditions.

Measuring temperature: 120° C.

Measuring frequency: 25.05 MHz

Spectrum width: 1,500 Hz

Filter width: 1,500 Hz

Pulse repetition period: 4.2 sec

Pulse width: 7 ηsec

Integration times: 2,000–5,000

From the $^{13}$C-NMR spectrum obtained as above, the $P_E$, $P_B$ and $P_{BE}$ values can be concretely defined in accordance with the reports by, for example, G. J. Ray (Macromolecules, 10, 773, 1977), J. C. Randall (Macromolecules, 15, 353, 1982, J. Polymer Science, Polymer Physics Ed., 11, 275, 1973), and K. Kimura (Polymer, 25, 441, 1984).

The B value is 2 when the ethylene/1-butene random copolymer is a perfectly alternating copolymer, while the B value is 0 when the copolymer is a perfectly block copolymer.

A polypropylene composition containing an ethylene/1-butene random copolymer (B-1) whose B value is less than 1.0 tends to be lowered in the impact resistance.

The ethylene/1-butene random copolymer (B-1) as described above has a good compatibility with polypropylene, and a polypropylene composition containing such copolymer is excellent in flowability as well as in the rigidity and the impact resistance. Hence, such polypropylene composition can be molded into articles having good appearance.

The ethylene/1-butene random copolymer (B-1) can be prepared using a conventionally known vanadium or metallocene catalyst.

(B-2) Ethylene/1-octene Random Copolymer

The ethylene/1-octene random copolymer (B-2) used for the invention contains constituent units derived from 1-octene in an amount of 8 to 20% by mol, preferably 10 to 15% by mol.

The ethylene/1-octene random copolymer (B-2) containing constituent units derived from 1-octene in such an amount as described above has a glass transition temperature of not higher than −50° C., preferably not higher than −60° C., and has a melting point of not higher than 80° C., preferably not higher than 70° C. This melting point is measured as the main peak by a differential scanning calorimeter (DSC).

An intrinsic viscosity [η] of the ethylene/1-octene random copolymer (B-2) used for the invention, as measured in decalin at 135° C., is in the range of 1.5 to 3.5 dl/g, preferably 2.0 to 3.0 dl/g.

A crystallinity thereof as measured by X-ray diffractometry is less than 20%, preferably not more than 10%.

Further, in the ethylene/1-octene random copolymer (B-2) used for the invention, a parameter (B value) which indicates randomness of a copolymerized monomer chain distribution as measured by $^{13}$C-NN/R spectroscopy is in the range of 1.0 to 1.4.

The B value of the ethylene/1-octene random copolymer (B-2) can be determined in a manner similar to that for the B value of the aforementioned ethylene/1-butene random copolymer. That is, the B value of the ethylene/1-octene random copolymer (B-2) can be calculated from the following formula:

$$B = \frac{P_{OE}}{2P_O \cdot P_E}$$

wherein $P_E$ and $P_O$ are a molar fraction of the ethylene component and a molar fraction of the 1-octene component, respectively, contained in the ethylene/1-octene copolymer; and $P_{OE}$ is a molar fraction of the 1-octene/ethylene chain in all the dyad chains.

A polypropylene composition containing an ethylene/1-octene random copolymer (B-2) whose B value is less than 1.0 tends to be lowered in the impact resistance.

The ethylene/1-octene random copolymer (B-2) as described above has a good compatibility with polypropylene, and a polypropylene composition containing such copolymer is excellent in flowability as well as in the rigidity and the impact resistance. Hence, such polypropylene composition can be molded into articles having good appearance.

The ethylene/1-octene random copolymer (B-2) can be prepared using a conventionally known vanadium or metallocene catalyst.

Polypropylene Composition

The first polypropylene composition according to the present invention contains the polypropylene (A) in an amount of 95 to 55 parts by weight, preferably 85 to 65 parts by weight, and contains the ethylene/1-butene random copolymer (B-1) in an amount of 5 to 45 parts by weight, preferably 15 to 35 parts by weight (provided that (A)+(B-1) is 100 parts by weight).

The second polypropylene composition according to the present invention contains the polypropylene (A) in an amount of 95 to 55 parts by weight, preferably 85 to 65 parts by weight, and contains the ethylene/1-octene random copolymer (B-2) in an amount of 5 to 45 parts by weight, preferably 15 to 35 parts by weight (provided that (A)+(B-2) is 100 parts by weight).

These polypropylene compositions of the present invention are excellent in rigidity, heat resistance and impact resistance, particularly in low-temperature impact resistance.

These polypropylene compositions may further contain a propylene/ethylene random copolymer (C) in an amount of not more than 15 parts by weight, preferably 5 to 15 parts by weight, more preferably 5 to 10 parts by weight based on 100 parts by weight of the above-mentioned polypropylene composition.

The propylene/ethylene random copolymer (C) used for the invention contains constituent units derived from ethylene in an amount of 30 to 60% by mol, preferably 35 to 45% by mol.

The propylene/ethylene random copolymer (C) has an intrinsic viscosity [η], as measured in decalin at 135° C., of 2 to 12 dl/g, preferably 3 to 6 dl/g.

A polypropylene composition containing the propylene/ethylene random copolymer (C) is excellent in impact resistance, rigidity and flowability.

In the polypropylene composition of the invention, the polypropylene (A) and the propylene/ethylene random copolymer (C) may be contained in the form of a block copolymer of polypropylene and a propylene/ethylene random copolymer. The polypropylene (A) and the propylene/ethylene random copolymer (C) may be prepared in the same reactor.

The polypropylene composition according to the present invention may contain an inorganic filler if desired. The inorganic filler is contained in the composition in an amount of preferably 5 to 20% by weight.

Examples of the inorganic filler include finely powered talc, calcium carbonate, basic magnesium sulfate whisker, calcium titanate whisker and aluminum borate whisker.

The polypropylene composition according to the present invention may further contain various additives, for example, polyethylene (PE), heat stabilizer, aluminum salts of aromatic carboxylic acids, esters or salts of aromatic phosphoric acids, nucleating agent such as dibenzylidene sorbitol, ultraviolet light absorber, lubricant, antistatic agent, flame retardant, pigment, dye, other polymers, organic filler and an ethylene/propylene random copolymer (EPR) other than the above-described one, with the proviso that the object of the present invention is not marred.

The polypropylene composition of the present invention can be obtained by kneading the above-mentioned each components all together or one after another by means of a Henschel mixer, a twin-cylinder blender, a tumbling blender, a ribbon blender or the like, and then melt-kneading the resultant kneadate by means of a single screw extruder, a multiple screw extruder, a kneader, a Banbury mixer or the like.

Of these kneading devices, those showing high kneading performance such as a multiple screw extruder, a kneader and a Banbury mixer are preferably used, because a polypropylene composition of high quality wherein each components are homogeneously dispersed can be obtained by using them.

Effect of the Invention

The polypropylene composition according to the present invention is excellent in rigidity, heat resistance and impact resistance, particularly in low-temperature impact resistance.

The polypropylene composition of the invention having such excellent properties can be favorably applied to various uses, for example, to automotive interior or exterior trim such as a bumper.

EXAMPLE

The present invention will be described below in more detail with reference to examples, but it should be construed that the invention is in no way limited to those examples.

In the following examples, physical properties were measured in the following manner.

(1) Melt flow rate (MFR)

The melt flow rate (MFR) was measured in accordance with ASTM-D1238 under the conditions of a temperature of 230° C. and a load of 2.16 kg.

(2) Flexural modulus (FM)

The flexural modulus (FM) was measured in accordance with ASTM-D790 under the following conditions.

Size of a specimen:
12.7 mm (width)×6.4 mm (thickness)×127 mm (length)
Span: 100 mm
Flexural rate: 2 mm/min
(3) Izod impact strength (IZ)

The izod impact strength (IZ) was measured in accordance with ASTM-D256 under the following conditions.
Temperature: 23° C.
Size of a specimen:
12.7 mm (width)×6.4 mm (thickness)×64 mm (length)
Notch: A notch is provided by a mechanical process.

Examples 1–8

Polypropylene compositions set forth in Table 2 were molded into specimens for ASTM tests by means of an injection molding machine under the conditions of a resin temperature of 200° C. and a mold temperature of 40° C. The specimens were measured on the above-mentioned physical properties.

The results are set forth in Table 2.

The components used for preparing the polypropylene compositions are set forth in Table 1, wherein physical properties of each components are also set forth.

solid portion was suspended again in 275 ml of titanium tetrachloride, and the resultant suspension was heated at 110° C. for 2 hours to perform reaction.

After the reaction was completed, a solid portion produced by the reaction was again collected by means of hot filtration, and the solid portion was well washed with decane and hexane at 110° C. until no titanium compound was detected in the washing liquid.

A solid titanium catalyst component [A] obtained by the above process was stored as a decane slurry.

[Polymerization]

Into a 17-liter autoclave was introduced 4 kg of propylene and 45 liters of hydrogen at room temperature in a propylene atmosphere, and the temperature of the autoclave was elevated to 60° C. Then, to the autoclave were added 5.0 mmol of triethylaluminum, 5.0 mmol of dicyclopentyldimethoxysilane (DCPMS) and 0.05 mmol (in terms of Ti atom) of the above-obtained solid titanium catalyst component [A], and the temperature of the autoclave was further elevated to 70° C. to perform polymerization reaction at the

TABLE 1

| Component | MFR (g/10 min) | Constituent Unit (Amount: % by mol) | [η] (dl/g) | Tm (°C.) | Tg (°C.) | Crystallinity (%) | B Value |
|---|---|---|---|---|---|---|---|
| (A) | | | | | | | |
| PP-A | 25 | | | | | | |
| PP-B | 15 | | | | | | |
| PP-C | 15.5 | | | | | | |
| PP-D | 22 | ethylene (8.0) | | | | | |
| (B-1) | | | | | | | |
| EBR-1 | | 1-butene (19) | 2.5 | 30 | −64 | 2 | 1.1 |
| (B-2) | | | | | | | |
| EOR | | 1-octene (13) | 2.3 | 40 | −64 | 2 | 1.1 |
| (C) | | | | | | | |
| PER-1 | | ethylene (40) | 3.0 | | | | |
| Others | | | | | | | |
| EBR-2 | | 1-butene (11) | 1.8 | 73 | −53 | 20 | 1.1 |
| EPR | | ethylene (80) | 2.6 | | | | |

The abbreviations for each components in Table 1 and Table 2 have the following meanings.
(A) Polypropylene (1) PP-A: Polypropylene (trade name: HYPOL J800) Available from Mitsui Petrochemical Industries, Ltd.

(2) PP-B: High-Crystalline Homopolypropylene Prepared by the Following Process
[Preparation of catalyst]95.2 g of magnesium chloride anhydride, 442 ml of decane and 390.6 g of 2-ethylhexyl alcohol were heated together at 130° C. for 2 hours to give a homogeneous solution. To the solution was added 21.3 g of phthalic anhydride, and they were stirred at 130° C. for 1 hour to dissolve the phthalic anhydride in the solution to give a homogeneous solution. The homogeneous solution thus obtained was cooled to room temperature, and 75 ml of this solution was then dropwise added to 200 ml of titanium tetrachloride kept at −20° C. over a period of 1 hour. After the addition was completed, the resultant mixture was heated to 110° C. over a period of 4 hours. When the temperature of the mixture reached 110° C., to the mixture was added 5.22 g of diisobutyl phthalate (DIBP) and they were stirred for 2 hours at the same temperature. After completion of the 2-hour reaction, a solid portion produced by the reaction was collected by means of hot filtration. The same temperature for 40 minutes. Immediately after the reaction was completed, a small amount of ethanol was added to the reaction system to decompose the catalyst, and the unreacted propylene and hydrogen were removed from the system. Thus, 1,515 g of polypropylene was obtained as a powdery white solid.

The polypropylene thus obtained had MFR of 15 g/10 min.

(3) PP-C: High-Crystalline Homopolypropylene Prepared by the Use of a Prepolymerized Catalyst Described Below
[Preparation of prepolymerized catalyst]

A pressure-resistant 2-liter autoclave was charged with 1 liter of purified hexane, 100 mmol of triethylaluminum, 100 mmol of trimethylmethoxysilane (TMMS) and 10 mmol (in terms of titanium atom) of the above-mentioned solid titanium catalyst component [A] at 20° C. in a nitrogen atmosphere, and the content of the autoclave was stirred. Then, to the mixture in the autoclave was added 115 g of 3-methyl-1-butene to perform prepolymerization reaction at 20° C. for 2 hours with stirring. After the reaction was completed, a supernatant liquid was removed, and the residue was washed twice with purified hexane and suspended in purified decane. The whole amount of the resultant suspension was transferred into a catalyst bottle. Thus, a prepolymerized catalyst was obtained.

[Polymerization]

Using the prepolymerized catalyst obtained in the above, homopolymerization of propylene was carried out in a manner similar to that for preparing the PP-B (polypropylene-B).

The polypropylene thus obtained had MFR of 15.5 g/10 min.

(4) PP-D: Block Polypropylene Prepared by the Following Process

A 17-liter autoclave was thoroughly purged with propylene. Into the autoclave were introduced 4 kg of propylene and 60 liters of hydrogen, and the temperature of the autoclave was elevated to 60° C. Then, to the autoclave were added 5.0 mmol of triethylaluminum, 5.0 mmol of dicyclopentyldimethoxysilane (DCPMS) and 0.05 mmol (in terms of Ti atom) of the above-mentioned solid titanium catalyst component [A], to perform polymerization at 80° C. for 1 hour.

A liquid propylene was removed from the reaction system, and 100 liters of ethylene and 150 liters of propylene were added to the reaction system over 150 minutes. Then, the unreacted mixed gas was removed from the system to obtain 2.1 kg of block polypropylene as a powdery white solid.

The block polypropylene thus obtained had MFR of 22 g/10 min, contained constituent units derived from ethylene in an amount of 8.0% by weight, contained a n-decanesoluble portion in an amount of 11.1% by weight at room temperature, and had an intrinsic viscosity $[\eta]$ of the soluble portion of 3.0 dl/g.

(B-1) Ethylene/1-butene Random Copolymer

EBR-1:

Constituent units derived from 1-butene: 19% by mol

Intrinsic viscosity $[\eta]$: 2.5 dl/g (B-2) Ethylene/1-octene Random Copolymer

EOR:

Constituent units derived from 1-octene: 13% by mol

Intrinsic viscosity $[\eta]$: 2.3 dl/g (C) Propylene/Ethylene Random Copolymer

PER-1:

Constituent units derived from ethylene: 40% by mol

Intrinsic viscosity $[\eta]$: 3.0 dl/g

Others

EBR-2:

Constituent units derived from 1-butene: 11% by mol

Intrinsic viscosity $[\eta]$: 1.8 dl/g

EPR (Ethylene/propylene random copolymer):

Constituent units derived from ethylene: 80% by mol

Intrinsic viscosity $[\eta]$: 2.6 dl/g

PE (Polyethylene):

Hizex 1300J (trade name) available from Mitsui Petrochemical Industries, Ltd.

Talc:

Mean particle diameter: 2.5 μm

Content of particles having a diameter of not less than 5 μm: 3% by weight

Comparative Examples 1–5

Polypropylene compositions set forth in Table 2 were molded into specimens in the same manner as described above. The specimens were measured on the aforementioned physical properties.

The results are set for in Table 2.

Physical properties of each components of the polypropylene compositions are set forth in Table 1.

Examples 9–11

Polypropylene compositions set forth in Table 2 were molded into specimens for ASTM tests by an injection molding machine under the conditions of a resin temperature of 200° C. and a mold temperature of 40° C. The specimens were measured on the aforementioned physical properties.

The results are set forth in Table 2.

Physical properties of each components used for preparing the polypropylene compositions are set forth in Table 1.

TABLE 2

| | Composition | Ex. 1 | Comp. Ex. 1 | Comp. Ex. 2 | Ex. 2 | Comp. Ex. 3 |
|---|---|---|---|---|---|---|
| (A) | PP-A | 75 | 70 | 80 | 75 | 75 |
| | PP-B | | | | | |
| | PP-C | | | | | |
| | PP-D | | | | | |
| (B-1) | EBR-1 | 25 | | | 15 | |
| (C) | PER-1 | | | 20 | 10 | 10 |
| | EBR-2 | | | | | |
| | EPR | | 30 | | | 15 |
| | PE | | | | | |
| | Talc | | | | | |
| MFR | (g/10 min) | 16 | 13 | 16 | 16 | 15 |
| IZ | (kg · cm/cm) | 12 | 12 | 12 | 15 | 10 |
| FM | (kg/cm$^2$) | 12,500 | 10,500 | 11,000 | 12,000 | 12,000 |

| | Composition | Comp. Ex. 4 | Ex. 3 | Ex. 4 | Ex. 5 | Ex. 6 |
|---|---|---|---|---|---|---|
| (A) | PP-A | 75 | | | | |
| | PP-B | | 75 | | | 75 |
| | PP-C | | | 75 | | |
| | PP-D | | | | 75 | |
| (B-1) | EBR-1 | | 25 | 25 | 25 | 20 |
| (C) | PER-1 | | | | | |
| | EBR-2 | 30 | | | | |
| | EPR | | | | | |
| | PE | | | | | 5 |
| | Talc | | | | | |
| MFR | (g/10 min) | 18 | 13 | 14 | 15 | 14 |
| IZ | (kg · cm/cm) | 8 | 14 | 14 | 60 | 15 |
| FM | (kg/cm$^2$) | 13,000 | 13,500 | 16,000 | 14,000 | 14,000 |

| | Composition | Ex. 7 | Comp. Ex. 5 | Ex. 8 |
|---|---|---|---|---|
| (A) | PP-A | 60 | 60 | |
| | PP-B | | | |
| | PP-C | | | 75 |
| | PP-D | | | |
| (B-1) | EBR-1 | 20 | | 20 |
| (C) | PER-1 | | | |
| | EBR-2 | | | |
| | EPR | | 20 | |
| | Talc | 20 | 20 | 5 |
| MFR | (g/10 min) | 17 | 14 | 18 |
| IZ | (kg · cm/cm) | 35 | 20 | 30 |
| FM | (kg/cm$^2$) | 24,500 | 24,500 | 15,500 |

| | Composition | Ex. 9 | Ex. 10 | Ex. 11 |
|---|---|---|---|---|
| (A) | PP-A | 75 | 75 | 60 |
| | PP-B | | | |
| | PP-C | | | |
| | PP-D | | | |
| (B-2) | EOR | 25 | 15 | 20 |
| (C) | PER-1 | | 10 | |
| | EBR-2 | | | |
| | EPR | | | |
| | Talc | | | 20 |
| MFR | (g/10 min) | 18 | 18 | 18 |
| IZ | (kg · cm/cm) | 12 | 15 | 30 |
| FM | (kg/cm$^2$) | 12,000 | 12,000 | 24,000 |

What is claimed is:

1. A polypropylene composition molded article comprising:

(A) polypropylene in an amount of 85 to 65 parts by weight; and (B-1) an ethylene/1-butene random copolymer in an amount of 15 to 35 parts by weight, provided that (A)+(B-1) is 100 parts by weight, said ethylene-1-butene random copolymer having a content of units derived from 1-butene in the range of 18 to 20% by mol, an intrinsic viscosity (η) of 1.5 to 3.5 dl/g as measured in decalin at 135° C., a melting point of not higher than 50° C. as measured by a differential scanning calorimeter (DSC) as the main peak, a glass transition temperature (Tg) of not higher than −50° C., a crystallinity of less than 10% as measured by X-ray diffractometry, and a randomness parameter B value of 1.0 to 1.4 as measured by $^{13}$C-NMR spectroscopy.

2. A polypropylene composition molded article according to claim 1 wherein the composition further comprises (C) a propylene/ethylene copolymer in an amount of 5 to 15 parts by weight based on 100 parts by weight of (A)+(B-1), said propylene/ethylene copolymer having a content of units derived from ethylene in the range of 35 to 45% by mol and an intrinsic viscosity (η) of 2 to 12 dl/g as measured in decalin at 135° C.

3. A polypropylene composition molded article comprising:

(A) a polypropylene in an amount of 85 to 65 parts by weight; and (B-2) an ethylene-1-octene random copolymer in an amount of 15 to 35 parts by weight, provided that (A)+(B-2) is 100 parts by weight, said ethylene-1-octene random copolymer having a content of units derived from 1-octene in the range of 10 to 15% by mol, an intrinsic viscosity (η) of 1.5 to 3.5 dl/g as measured in decalin at 135° C., a melting point of not higher than 70° C. as measured by a differential scanning calorimeter (DSC) as the main peak, a glass transition temperature (Tg) of not higher than −50° C., a crystallinity of less than 10% as measured by X-ray diffractometry, and a randomness parameter B value of 1.0 to 1.4 as measured by $^{13}$C-NMR spectroscopy.

4. A polypropylene composition molded article according to claim 3 wherein the composition further comprises:

(C) a propylene/ethylene copolymer in an amount of 5–15 parts by weight based on 100 parts by weight of (A)+(B-2), said propylene/ethylene copolymer having a content of units derived from ethylene in the range of 35 to 45% by mol and an intrinsic viscosity (η) of 2 to 12 dl/g as measured in decalin at 135° C.

5. The polypropylene composition molded article as claimed in claims 1, 2, 3, or 4, wherein the polypropylene composition further comprises an inorganic filler in an amount of 5–20% by weight, based on the weight of the entire composition.

* * * * *